Feb. 3, 1970 D. M. BEERY 3,493,451
VACUUM PRESS AND METHOD OF LAMINATING THEREWITH
Original Filed Nov. 28, 1960 3 Sheets-Sheet 2
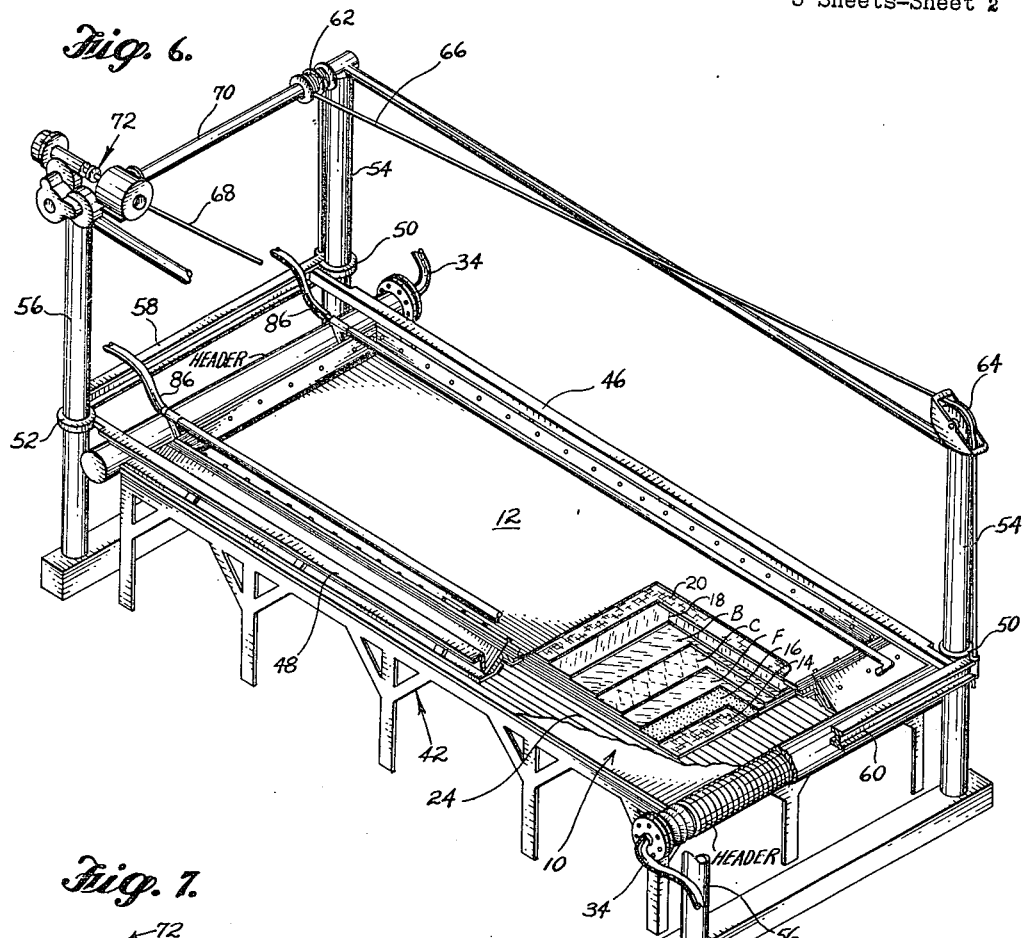
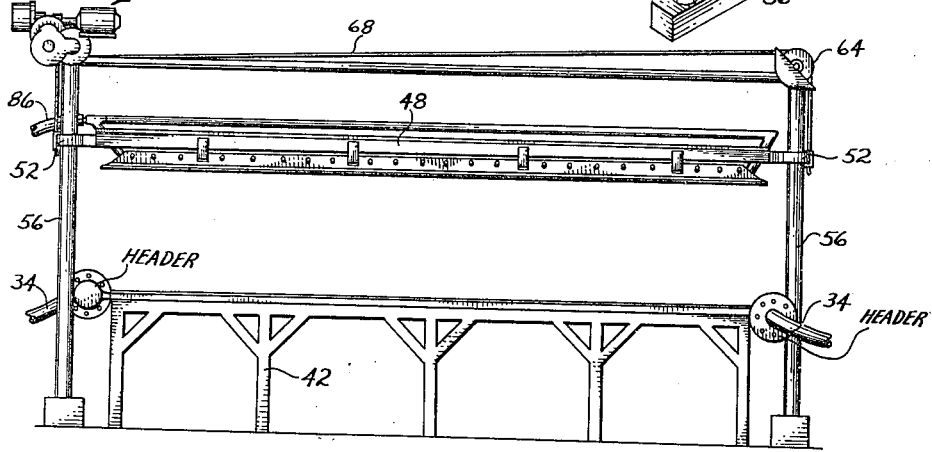
INVENTOR.
DALE M. BEERY
BY
Reynolds & Christensen
ATTORNEYS Feb. 3, 1970  D. M. BEERY  3,493,451
VACUUM PRESS AND METHOD OF LAMINATING THEREWITH
Original Filed Nov. 28, 1960  3 Sheets-Sheet 3
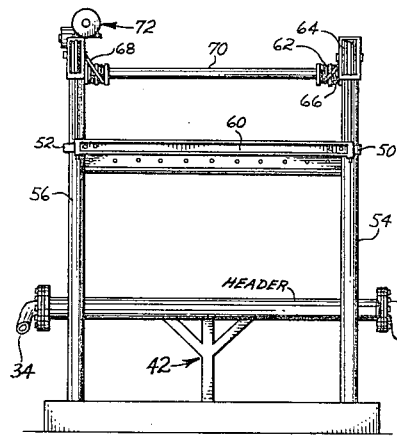
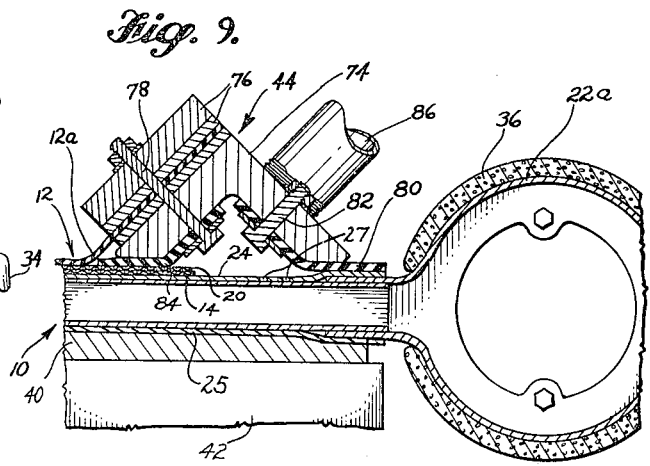
INVENTOR.
DALE M. BEERY
BY
Reynolds & Christensen
ATTORNEYS United States Patent Office 3,493,451
Patented Feb. 3, 1970

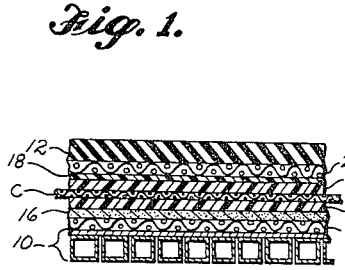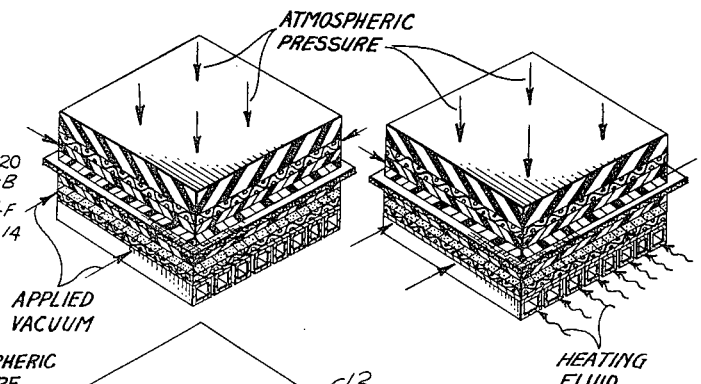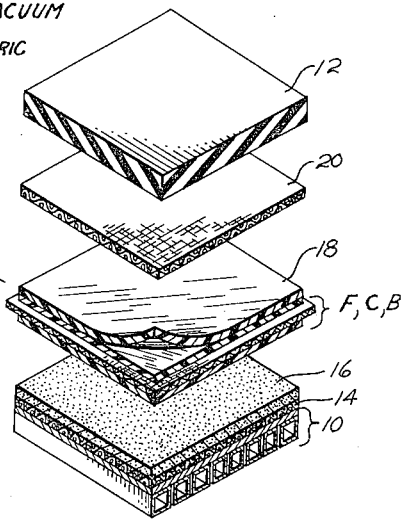

3,493,451
VACUUM PRESS AND METHOD OF
LAMINATING THEREWITH
Dale M. Beery, Seattle, Wash., assignor to Boeing Airplane Company, Seattle, Wash., a corporation of Delaware
Continuation of application Ser. No. 72,094, Nov. 28, 1960. This application Nov. 2, 1966, Ser. No. 591,648
Int. Cl. B32b 31/00; B30b 13/00
U.S. Cl. 156—219                          11 Claims

ABSTRACT OF THE DISCLOSURE

This invention relates to a vacuum press and the manufacture of laminates in the press. A laminar assembly including a thermoplastic resin layer is engaged in the press between platens; the assembly is heated and vacuum is applied to the assembly about the periphery of the platens so as to remove gases and vapors from the surfaces of the thermoplastic resin layer.

This application is a continuation of Ser. No. 72,094, filed Nov. 28, 1960, now abandoned.

This invention relates to improved methods and apparatus for manufacturing laminar products and more particularly concerns the manufacture of decorative thermoplastic plastic laminar sheets such as clear vinyl-faced rigid sheets having decorative core layers. The invention is herein illustratively described by reference to the preferred mode of practicing the same; however, it will be recognized that certain modifications and changes therein with respect to details may be made without departing from the underlying and essential features involved.

Light-weight attractive wall structures have been developed, for airplane cabin interiors and the like, featuring rigid (i. e., non-pliable) decorative laminate sheets stiffened by honeycomb reinforcing bonded to the back sides thereof. These sheets desirably consist of an opaque plastic (usually white vinyl) backing layer, a clear plastic (again preferably vinyl, either uncolored or tinted) face layer and a decorative core layer fused by heat and pressure to the face and backing layers. The face layer may be smooth, or given an embossed or matte finish. The backing layer is usually opaque and may be white or otherwise colored to impart desired lighting effects. In a practical case these laminates are about 1/32 of an inch thick but may vary according to preference or design requirements. Typically polyvinyl chloride or similar thermoplastic face and backing layers protectively cover a decorative paper, foil, fabric, film or fiber core layer to which they are fused or bonded under pressure and heat of activation. Such laminates are noninflammable, stain resistant, easily cleaned and durably attractive and wear resistant. They may be used not only for wall surfacing, but also for screens, for counter top or cabinet coverings, and in various other applications.

In the manufacture of panels of this general type by conventional methods, thermal fusion or bonding of the laminae to produce an acceptably uniform product requires the application of great pressure to the assembled layers. Commonly pressures exceeding 700 pounds per square inch are used. Such high pressures were necessary in order to eliminate condensed and uncondensed vapors and gases resulting from or representing moisture in the core material, entrapped air, decomposition of the polyvinyl chloride or other surface into hydrogen chloride gas or other gases, and decomposition of sizing compounds, such as starch, in the core layer. Sometimes gases and vapors were not completely eliminated despite the high pressures employed and rejects were not uncommon. Sometimes gases went into solution in the vinyl materials with deleterious effects. Also, at these high pressures press construction was necessarily massive and expensive and it was not practical to manufacture sheets of large size. The difficulty lay partly in the problem of maintaining uniform spacing between press platens throughout the entire area of a sheet because of platen deflection under the heavy forces applied, and partly in the problem of entirely eliminating vapors and gases due to the increased distances of travel in order to escape from between the laminations in the case of a large sheet. Furthermore, in such massive structures heat-up and cool-down time was correspondingly increased and production rates were retarded due to the necessity of initially heating the assembly and then cooling the laminate while still under pressure so as to prevent delamination or appearance of bubbles therein when released from the press.

The present invention is directed to a simplified and economical apparatus and technique for manufacturing these and similar laminar products. A further object hereof is to devise a rapid-production technique for this general purpose which permits manufacture of large sheets with practically the same ease and speed, and without any apparatus penalty, as that permitted for small sheets. As a practical matter, the invention makes possible manufacture of substantially larger sheets than was heretofore economically feasible or practical and at much lower cost and substantially higher rates of production, with fewer rejects and with greater versatility in terms of the types of decorative effects that may be achieved and the range of materials that may be used for the layers.

These and other objects and advantages are realized by a laminate method of my invention wherein I use a vacuum press of the type in which the platens are impermeable and the vacuum is applied about the periphery of the platens; together with a laminar assembly that includes so-called bleeder layers which enable me, firstly, to evacuate the gases and vapors from the surfaces of each thermoplastic layer while I engage the assembly in the press between the platens and apply heat to the same to soften the thermoplastic material, and then, to maintain the engaged, evacuated condition of the assembly in the press while I increase the heat applied to the assembly to cause the softened thermoplastic layer to fuse to one of the bleeder layers. The latter have the thermoplastic layer sandwiched surface to surface between them and are adapted so that while the assembly is heated and engaged in the press in the softening stage, the bleeder layers are permeable under the applied vacuum to the peripheral flow of gases and vapors from the surfaces of the thermoplastic layer. In addition, when the temperature applied to the assembly is increased to fuse the thermoplastic layer to the one bleeder layer, the other bleeder layer is non-laminable with the thermoplastic layer, at the fusion temperature of the thermoplastic material, so that the laminate and said other bleeder layer can be parted from one another after the assembly has cooled.

The invention will be illustrated hereinafter in the manufacture of a laminar product comprising two thermoplastic layers with a decorative core layer therebetween. In this connection, reference should be made to the accompanying drawings wherein:

FIGURES 1 through 5 are simplified diagrams showing successive steps of the method.

FIGURE 6 is a perspective view with parts broken away showing a typical press for use in method aspects of the invention and embodying certain apparatus features of the invention.

FIGURE 7 is a side elevation view, and FIGURE 8 an end elevation view of the press.

FIGURE 9 is an enlarged sectional detail showing certain preferred features of the platen construction.

FIGURE 10 is a perspective view with parts broken away showing other details of construction of the heated platen.

FIGURE 11 is a fragmentary sectional detail taken on the axis of one header of the platen shown in FIGURE 10.

Referring to FIGURES 1 through 5, the lower, rigid heat-exchange press platen is designated 10 and the upper, flexible vacuum membrane cover platen 12. In the first step of a representative method of utilizing the invention a coarse bleeder cloth sheet 14, such as a layer of Osnaberg cloth, a porous fabric resembling burlap, is placed directly on the platen 10 and is covered by a porous metal caul sheet 16, such as a flame-sprayed aluminum particle sheet. The clear polyvinyl chloride face layer F is deposited on the caul 16, followed by the permeable decorative core layer C, the opaque plastic backing layer B, a parting film 18, such as a thin sheet of polyvinyl alcohol material, and finally a coarse fabric sheet material 20, such as one or two layers of Osnaberg cloth, the various layers and sheets being arranged in superposed registry. The core layer C preferably extends outwardly beyond the edges of the immediately adjoining face and backing layers F and B to prevent entrapment of gases and vapors between these outer layers.

With the layers assembled on the stationary lower platen as described in conjunction with FIGURE 1, the next step is to lower the cover platen 12 to form an enclosure containing the laminae and apply vacuum-inducing negative pressure to the enclosed space. As the partial vacuum develops, it permits a substantial atmospheric pressure to act downwardly on the flexible cover platen and thereby compress the laminae, as illustrated in FIGURE 2. With the laminae thus compressed the layers are heated in two stages, in the first of which the temperature is raised to approximately 320° F. while the gases and vapors are bled away from the assembly. A period of four and one-half minutes at this temperature is typical of that required to accomplish the first stage. In the second stage, the temperature is increased to approximately 380° F. and is held for approximately two minutes. Heating the laminate to something less than maximum temperature for an initial period also tends to assure equal temperature distribution throughout the laminate as the polyvinyl chloride layers soften and assures that they will soften at a uniform rate throughout. Accordingly, despite the flexibility of the upper platen, there will be no tendency to squeeze and extrude materials out of one localized area into another should the former's temperature happen to reach the softening point first. Thus, when the maximum required temperature is applied as it is in the latter phase, the uniformly activated material responds alike in all zones. After this two-stage heating period the platen temperature is immediately reduced to less than 100° F. so as to cool the laminate as rapidly as possible in order to prevent discoloration thereof due to overheating. It should be noted that the laminate should not be cooled below 70° F. (room temperature) because it may become brittle and may crack on removal from the caul plate to which it tends to adhere slightly. Care should be exercised not to cause buckling or undue flexure of the laminate when it is being removed from the caul plate because this may cause cracking.

Heating is accomplished in the example by passing superheated steam or other heating fluid through the tubular passageways formed in the base platen 10, as shown in FIGURE 3. Cooling is accomplished by passing cooling fluid through the tubular passages in the platen 10 as indicated in FIGURE 4. After the upper platen 12 is lifted, the completed laminate F, C, B is removed from the press for any necessary trimming of edges. At that time the parting film 18 is peeled from the backing layer F should there be any slight tendency for it to stick to the layer F. The already-cooled press is then ready for a succeeding similar laminating operation.

In the step of applying vacuum-inducing pressure to the space enclosed between the two platens 10 and 12, a negative pressure of the order of 11 or 12 pounds per square inch relative to atmospheric pressure is sufficient to create the necessary compressive force for achieving the desired result in practically all cases. This pressure is not critical and may vary from a value as near to a perfect vacuum as possible, to a pressure less than 11 pounds per square inch, but it should be realized, of course, that if the vacuum is not sufficient, the quality of the product will suffer on two accounts, namely, incomplete fusion and bonding of the laminae and incomplete elimination of entrapped vapors and gases from between the laminae as well as from the exterior thereof.

In the steps of heating the assembled layers to plastic activation temperature, steam at a desired temperature such as 380° F. is passed through the heating passages in the platen 10. The applied heat quickly reaches the layers F, C and B through the coarse bleeder cloth 14 and the readily heat transmissive porous aluminum caul 16. At these elevated temperatures there may be some slight decomposition of the polyvinyl chloride films B and F which produces hydrogen chloride gas. There may also be moisture included in the layers and there may be air entrapped between the layers. In addition, decomposition of materials such as starch or other sizing in the core layer C may yield vapors and gases. All of these vaporous or gaseous constituents must be removed in order to obtain a uniform durable product. Failure to do so can result in delamination, bubbles, weakness, brittleness or other impairments to the quality of the product. The method herein disclosed, though it uses low-pressure bonding (viz, of the order of one percent of the usual bonding pressures) achieves these objectives even with very large sheets.

The porosity of the surface-embossing caul 16 permits it to carry vapors from the exterior surface of face layer F to the coarse bleeder cloth 14. Its conductivity helps to minimize any temperature gradients along the face of the layer F. The vapors passing through caul 16 are drawn off by the vacuum and by their own pressure acting outwardly through the caul and the permeable cloth 14. Similarly, vapors and gases entrapped between the polyvinyl chloride layers F and B are partly driven by their own pressure and largely drawn by the vacuum outwardly through the interstices in the core layer C because of the characteristics of this core layer. The core layer commonly is woven fabric, but may be a different material such as an unwoven mat of fibers, a sheet of paper, etc., or may be a composite of two layers one of which, for example, is in the nature of a layer of cloth or the like, and the other of which is a decorative layer such as a thin impermeable film, a foil, a thin film of randomly scattered fibers or the like creating a design effect, or a design painted or printed directly on the back side of layer F. A characteristic of the method of this invention is the use of a core layer, single or composite, which serves the multiple functions of vapor and gas removal and decoration. The ornamental effect imparted by the core layer C is clearly visible through the transparent face layer F to which it is invisibly fused and uniformly bonded in the finished product so that no bubbles or other imperfections are present. The backing layer B, being preferably opaque and of any desired color effect, but commonly white, adds to the lustre and brilliant appearance of the product by producing a desirable background lighting effect on the decorative core layer to which it is fused and bonded.

Vapors generated at the exterior side of the backing layer B are drawn off either through a separate caul similar to the caul 16 and acting in lieu of the layers 18 and 20, or are drawn off by bleeder passages formed by the parting film 18 when the latter is crinkled under heat and pressure after being initially indented in the pattern of the coarse cloth layer 20 pressing against it. The film 18 is quite thin and when pressure is applied and the assembly is heated, there is a tendency for the parting film 18 to wrinkle, with resultant passages afforded adjacent the layer B for escapement of gas and vapor. The parting film 18 prevents the backing layer B from sticking to the fabric layer 20.

In an alternative procedure the positions of the backing and face layers B and F are reversed and selected embossing design effects are imparted to the face layer F by appropriate choice of the layer 20. Grass cloth, grass matte, lace and similar materials may be used for this purpose, impressing their designs on the face layer F through the flexible parting film 18 under applied heat and pressure.

In a typical case, such as that using the illustrative materials just described, the entire process commencing with the application of heat and pressure to the materials and continuing through to the conclusion requires approximately eight to twelve minutes, assuming an appropriate platen design capable of raising platen temperature to plastic activation temperature in about two minutes and of cooling platen temperature back to room temperature in about the same period of time.

In the remaining drawing (FIGURES 6 through 11) there is illustrated the preferred press construction for practicing the method. In a practical and successful press already operating, the rigid platen 10 is approximately seven feet by thirteen feet. There is no reason why it may not be even larger, or of course smaller, if desired. This platen is made up in the example by approximately 148 elongated rectangular thin-wall stainless steel tubes 22 disposed in parallel coplanar relationship with a slight spacing (i.e., one-fourth inch) between them. The top side of the series of tubes is covered by a thin flat aluminum sheet 24 which is not bonded to the tubes but is merely laid in place and is free to slide in relation to the tube surfaces. A second thin flat aluminum sheet 25 is similarly placed in unbonded contact with the lower side of the series of tubes 22. By suitable means such as apertures 27 provided in the upper sheet in the area thereof covered by the marginal vacuum channel 44 to be described the space between the sheets 24 and 25, occupied by the tubes 22, is evacuated during operation of the press. By so evacuating this space, the sheet 24 is drawn into uniform contact with the stainless steel tubes for purposes of maximum heat transfer rate between the tubes and the work lying on the sheet 24. With a platen thirteen feet long and with stainless steel tubes and the aluminum sheets 24 and 25, there will be as much as three-fourths of an inch difference between the thermal expansion of the tubes and sheet when temperature changes between its operating limits. Since the tubes are not bonded to the sheets, however, this differential temperature expansion and contraction is accommodated without stresses developing between the platen components. On the other hand, if the sheets were bonded to the tubes, the resulting stresses would cause severe buckling of the platen. Buckling in such a case could be prevented only by a more rigid and massive construction which in turn would defeat the objective of a platen having low heat storage capacity in order to achieve a rapid cycling press. The vacuum envelope for the tubes 22 is completed by narrow sheets 29 which interconnect sheets 24 and 25 at the sides of the platen. In fact, to further the objective of a nonbuckling light-weight platen it is desirable to use a lubricant such as molybdenum disulfide between the surfaces of the sheets 24 and 25 and the tubes 22.

As to further features of the press platen construction, each tube terminates at each end in a hollow annular collar 22a of similar thin-walled sheet material formed in halves silver-brazen together and to the tube ends. At each end of the platen the collars are held in coaxial series alignment, with spacer shims 26 interposed therebetween to establish the desired intertube spacing, by suitable means such as the bolts 28 extending through aligned apertures in the inwardly directed flanges of the adjacent halves of successive annular collars 22a, and by brazing the collars together to form a pressure-tight structure. Bellows-type expansion couplings 30 are brazed to the respective end gaskets of the series and are in turn secured to fittings 32 by which the resultant headers are connected to the heat exchange fluid lines 34. As indicated, the materials used in the headers are the same thin-walled materials as those used in the tubes 22 with respect to coefficient of thermal expansion, at least, so that, as the total platen assembly including the end headers contracts and expands with temperature change, all parts will tend to undergo the same change of dimensions and there will be no undue stresses in the composite platen structure. Lagging 36 is provided on the headers to conserve heat, and a suitable bed of lagging material 40 is provided beneath the platen for the same purpose, such bed resting upon the machine frame 42 which may be of any appropriate design. Suitable external piping connections and control valve arrangements in the lines 34 provide for delivery and removal of steam or other heating fluid, and for regulation of platen temperatures, as well as for delivery and removal of water or other coolant for purposes of the described method.

The cover or blanket platen 12 comprises a sheet of neoprene 12a or other suitable flexible vacuum membrane material capable of withstanding the operating conditions of the press and having the requisite strength and sealing properties. This flexible vacuum membrane is mounted in a surrounding rectangular frame 44 which in turn is carried by elongated supports 46 and 48 mounted on sliders 50 and 52 adapted to move up and down in unison on the corner posts 54. These sliders are interconnected in pairs at the ends of the structure by cross bars 58 and 60 and are moved by a system of pulleys 62 and 64, cables 66 and 68 and a drive shaft 70 adapted to be turned in either direction selectively by the motor unit 72. The details of this part of the apparatus are of secondary concern and any suitable means for raising and lowering the upper platen may be employed so as to make it convenient to insert and remove layers of material between successive operations of the press.

The upper platen frame structure comprises a downwardly opening channel member 74 to the upper side of which the edge of the neoprene membrane 12a is sealingly clamped by means of the clamp plates 76 and clamp bolts and nuts 78 as shown. An outer-edge compressible seal of elastic material, designated 80, is bolted to the underside of the channel member 74 along its outer edge by the bolts 82. This sealing member 80 contacts the lower platen face to form a vacuum-tight seal therewith when the frame is pressed downwardly against the lower platen. A flexible rubber hold-down flange 84 is clamped against the lower face of the channel member 74 along its inner edge and projects inwardly toward the membrane 12a to act as a hold-down which clamps the protruding edges of the fabric and caul layers against the surface of the bottom press platen 10 and holds them in place, but without preventing free communication from the open interior of the frame channel 44 into the interior of the space between the two platens. Suction pipes 86 extend from the frame channel interior to a suitable source of vacuum (not shown). The channel interior extends continuously around the entire upper platen and thereby serves to distribute the negative pressure uniformly around the entire periphery of such platen so that all parts of the work material in the press are subjected to the negative pressure as desired.

In using such a press according to the best presently known method of practicing the invention, the projecting edges of the bleeder cloth layers 14 and 20 are caused to extend beneath the inner hold-down or sealing flange 84 of the upper platen vacuum frame, whereas the porous metal caul plate 16 may or may not do so. This caul plate should be cleaned periodically with trichloroethylene, or other solvent, wiping it with cheesecloth in the grain direction to remove any metal slivers presented. The two rigid vinyl sheets F and B should also be cleaned carefully before insertion into the press, preferably using ethyl aclohol or a mixture of three parts by volume of ethyl alcohol and one part by volume of trichloroethylene, in order to remove dirt, dust, lint and other foreign materials which might impair the appearance of the finished product. The caul plate should extend at least one-half inch beyond the rigid vinyl sheet F on all sides. The permeable core layer or the permeable component thereof should also extend at least one-half inch beyond the rigid vinyl sheets B and F on all sides and all wrinkles should be removed from the core layer and from the bleeder sheets 14 and 20. Open-work core materials such as a light scattering of colored fibers, netting or Irish lace, to name examples, should be accompanied by a sheet of more closely woven bleeder material, such as a thin layer of nylon chiffon, which will fuse into the adjacent vinyl layer during the final heating phase of the pressing operation, but which in the initial phases provides a continuity of bleeder passages extending throughout the entire area of the lay-up and permits ready escapement of vapors and gases from between the impermeable surface layers B and F. Because a nylon chiffon sheet fuses uniformly into the back side of the face layer F, it is not visible and does not impair the appearance of the lace or other material behind it. Alternatively, the nylon chiffon may be placed behind the lace, that is, next to the backing layer B, to the same effect. Obviously nylon sheeting is only one example of a suitable core bleeder material.

In order to assist further in removing air from the core of the laminate, especially in those cases wherein the bleeder sheet in the core does not extend beyond the edges of the face and backing layers, a strip of cotton webbing one and one-half to two inches wide may be inserted in the margins between the face and backing layers and in overlapping contact with the core bleeder layer. This strip of webbing projects beyond the marginal edges of the adjacent outer layers and occupies only the marginal edge areas of the laminate which are later trimmed off.

In placing the polyvinyl alcohol parting film on the clear vinyl layer F in the reverse lay-up procedure last described (i.e., where the layer F is placed above the layer B and the latter is placed in contact with the porous caul 16), the dull side of the polyvinyl alcohol film is placed against the clear vinyl layer F and the film should extend at least one inch beyond the layer F on all sides.

What is claimed is:

1. In the manufacture of laminates using a vacuum press of the type wherein the platens are impermeable and the vacuum is applied about the periphery of the platens, the steps of applying heat and the vacuum to a laminar assembly which is engaged in the press between the platens and comprised of a layer of thermoplastic resin material sandwiched surface to surface between layers of bleeder material, so as to evacuate the assembly as the thermoplastic resin material softens, said bleeder layers being adapted so that while the assembly is so heated and engaged in the press, the bleeder layers are permeable under the applied vacuum to the peripheral flow of gases and vapors from the surfaces of the thermoplastic layer; and thereafter maintaining the engaged evacuated condition of the assembly in the press while increasing the heat applied to the assembly to cause the softened thermoplastic layer to fuse to one of the bleeder layers, the other of said bleeder layers being non-laminable with the thermoplastic layer at the fusion temperature of the thermoplastic material so that the laminate and said other bleeder layer can be parted from one another after the assembly has cooled.

2. The method according to claim 1 wherein the other of the bleeder layers is also adapted to emboss the thermoplastic layer.

3. The method according to claim 1 wherein the heat is applied conductively through the platens.

4. The method according to claim 1 wherein a part of the one bleeder layer is also adapted to fuse in the lamination step.

5. The method according to claim 1 wherein one of the platens is rigid and the assembly is supported thereon.

6. The method according to claim 1 wherein the other bleeder layer comprises a thin parting film of pliable material which is disposed next to the thermoplastic layer, and a coarsely textured mat which is disposed back-to-back with the film and adapted to allow wrinkling of the film under the applied heat.

7. The method according to claim 6 wherein the parting film is of polyvinyl alcohol resin.

8. The method according to claim 1 wherein the thermoplastic layer comprises a sheet of polyvinyl chloride resin.

9. The method according to claim 1 wherein the material in the one bleeder layer is decorative in character.

10. In the manufacture of decorative laminates using a vacuum press of the type wherein the platens are impermeable and the vacuum is applied about the periphery of the platens, the steps of applying heat and the vacuum to a laminar assembly which is engaged in the press between the platens and comprised of two air-impermeable layers of polyvinyl chloride resin sandwiched alternately and surface to surface among three layers of bleeder material, the intermediate layer of which comprises a decorative material, so as to evacuate the assembly as the resin softens, said bleeder layers being adapted so that while the assembly is so heated and engaged between the platens, the bleeder layers are permeable under the applied vacuum to the peripheral flow of gases and vapors from the surfaces of the polyvinyl chloride layers; and thereafter maintaining the engaged evacuated condition of the assembly between the platens while increasing the heat applied to the assembly to cause the softened polyvinyl chloride layers to fuse to the intermediate bleeder layer, the two remaining bleeder layers being non-laminable with the polyvinyl chloride layers at the fusion temperature of the resin so that the laminate and said two remaining bleeder layers can be parted from one another after the assembly has cooled.

11. In a vacuum press, platens enclosing a work space means for applying heat to the space, and a bleeder layer interposed between the platens in the space, comprising a thin film of polyvinyl alcohol resin, and a coarsely textured mat which is disposed back to back with the film and adapted to allow wrinkling of the film under the applied heat.

References Cited

UNITED STATES PATENTS

| 1,782,852 | 11/1930 | Jeffray | 100—90 |
| 2,485,725 | 10/1949 | Francis | 161—165 |
| 2,965,532 | 12/1960 | Taylor | 156—247 |
| 2,978,376 | 4/1961 | Hulse | 156—247 |
| 2,978,806 | 4/1961 | Herbert | 156—286 |

ROBERT F. BURNETT, Primary Examiner

W. J. VAN BALEN, Assistant Examiner

U.S. Cl. X.R.

100—91; 156—286, 289, 382, 583; 161—95, 96